United States Patent
Cheng et al.

(10) Patent No.: US 12,509,346 B2
(45) Date of Patent: Dec. 30, 2025

(54) LASER SEALING METHODS FOR CLOSING VENTHOLES OF MICROMECAHNICAL DEVICES

(71) Applicant: Robert Bosch GmbH, Stuttgart (DE)

(72) Inventors: Bo Cheng, Malden, MA (US); Holger Rumpf, Reutlingen (DE); Jens Frey, Filderstadt (DE); Charles Tuffile, Swansea, MA (US); Stephanie Karg, Stuttgart (DE); Tobias Joachim Menold, Weil der Stadt (DE)

(73) Assignee: Robert Bosch GmbH (DE)

( * ) Notice: Subject to any disclaimer, the term of this patent is extended or adjusted under 35 U.S.C. 154(b) by 201 days.

(21) Appl. No.: 17/973,217

(22) Filed: Oct. 25, 2022

(65) Prior Publication Data

US 2024/0132342 A1   Apr. 25, 2024
US 2024/0228267 A9   Jul. 11, 2024

(51) Int. Cl.
*B81C 1/00* (2006.01)
*B81B 7/00* (2006.01)

(52) U.S. Cl.
CPC ........ *B81C 1/00293* (2013.01); *B81B 7/0041* (2013.01); *B81C 2203/0145* (2013.01)

(58) Field of Classification Search
None
See application file for complete search history.

(56) References Cited

U.S. PATENT DOCUMENTS

| | | | |
|---|---|---|---|
| 10,017,375 B2 | 7/2018 | Reichenbach et al. | |
| 10,023,460 B2 | 7/2018 | Breitling et al. | |
| 10,836,631 B2 | 11/2020 | Reinmuth et al. | |
| 2007/0020926 A1* | 1/2007 | Kalvesten | B81B 7/0006 257/E21.597 |
| 2017/0113919 A1* | 4/2017 | Reichenbach | B81B 7/0035 |
| 2017/0113923 A1 | 4/2017 | Reichenbach et al. | |
| 2017/0158499 A1* | 6/2017 | Ametowobla | B81C 1/00325 |
| 2020/0156931 A1* | 5/2020 | Staffeld | B81C 1/00293 |
| 2021/0229983 A1* | 7/2021 | Gehl | B81B 3/0021 |
| 2022/0082581 A1* | 3/2022 | Takizawa | H01L 21/02 |

FOREIGN PATENT DOCUMENTS

DE   102015224488 A1 *  6/2017

OTHER PUBLICATIONS

Translation for Ametowobla DE10 2015 224 488 (Year: 2017).*

* cited by examiner

*Primary Examiner* — Jessica S Manno
*Assistant Examiner* — Christopher A. Schodde
(74) *Attorney, Agent, or Firm* — Dickinson Wright PLLC

(57) ABSTRACT

A venthole of a micromechanical device is sealed with laser irradiation. A micromechanical device has a substrate, such as silicon. The substrate has an upper surface, and defines a venthole leading to a chamber that contains a device, and a trench extending downward from the upper surface and located offset from the venthole. A laser pulse is applied to the substrate at or within the trench. This causes a portion of the substrate located below the upper surface to melt and travel laterally to close off and seal the venthole laterally from beneath the upper surface.

11 Claims, 9 Drawing Sheets

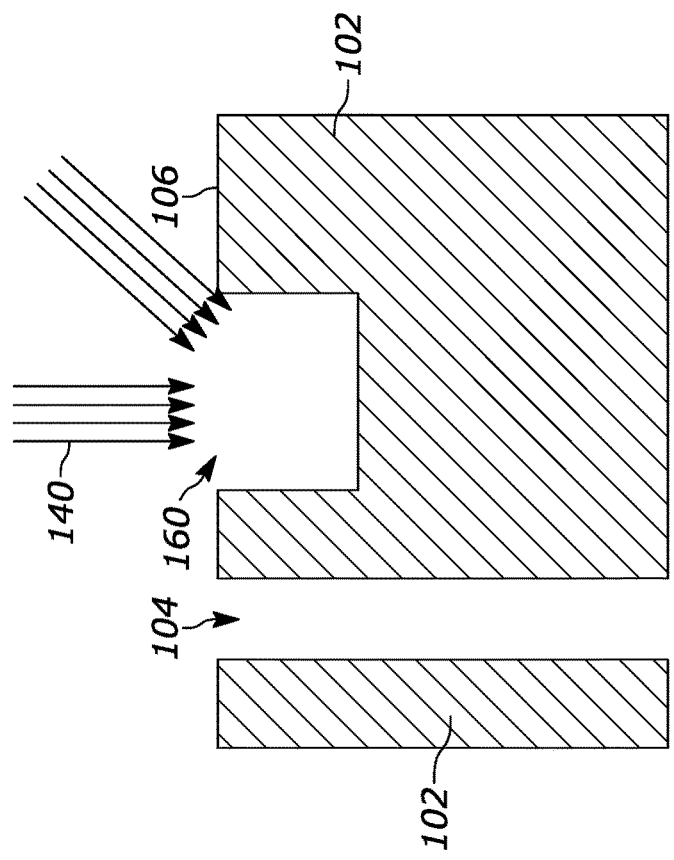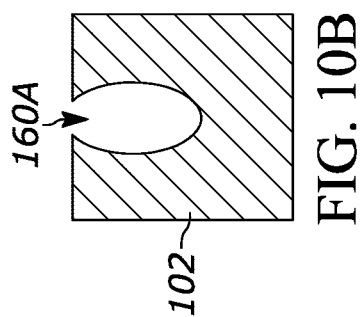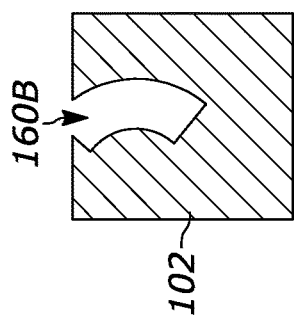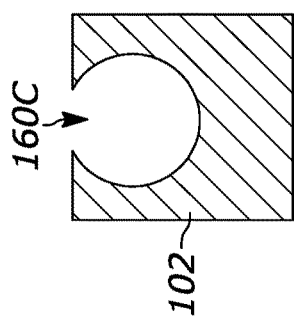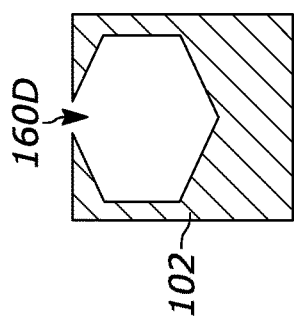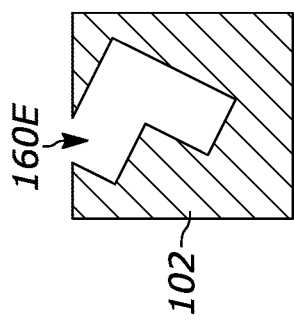

LASER SEALING METHODS FOR CLOSING VENTHOLES OF MICROMECAHNICAL DEVICES

TECHNICAL FIELD

The present disclosure relates to laser sealing methods for closing ventholes of micromechanical devices. In some particular embodiments, the laser is applied to a trench offset from the venthole. In some particular embodiments, the laser is tilted with respect to the micromechanical device.

BACKGROUND

Various micromechanical devices (e.g., mi croelectromechanical systems (MEMS), inertial measurement units (IMUS) etc. include a venthole opening leading to a chamber that contains an encapsulated device. In recent years, a pulse laser irradiation technique has been utilized for sealing the venthole opening. This technique seals the venthole opening to encapsulate gasses and critical pressure inside the device chamber of the micromechanical device.

SUMMARY

In an embodiment, a method of sealing a venthole of a micromechanical device is provided. The method includes providing a micromechanical device having a substrate, the substrate having an upper surface. The substrate defines a venthole leading to a chamber that contains a device. The substrate defines a trench extending downward from the upper surface and located offset from the venthole. The method also includes applying a laser pulse to perform laser irradiation on the substrate at the trench, wherein the applying causes a portion of the substrate located below the upper surface to melt and seal the venthole laterally and from beneath the upper surface.

In another embodiment, a method of sealing a venthole of a micromechanical device is provided. The method includes providing a micromechanical device having a substrate, the substrate having an upper surface extending along an upper plane, and the substrate having a venthole wall extending downward from the upper surface, the venthole wall defining a venthole that extends along an axis and leads to a chamber that contains a device. The method also includes applying a laser beam to the venthole wall, wherein the laser beam extends oblique to the upper plane and oblique to the axis of the venthole, wherein the applying causes a portion of the substrate located below the upper plane to melt and seal the venthole laterally and from beneath the upper plane.

In another embodiment, a micromechanical device comprises a substrate having an upper surface, the substrate defining a venthole leading to a chamber that contains a device, the substrate further defining a trench extending downward from the upper surface, wherein the trench is located adjacent and offset from the venthole. The micromechanical device also comprises a solidified melt of the substrate extending laterally beneath the upper surface and connecting the trench with the venthole, wherein the solidified melt seals the venthole and has a peak located below the upper surface.

BRIEF DESCRIPTION OF THE DRAWINGS

FIG. 10A is a cross-sectional view of a pulse laser irradiation technique applied at an offset trench with either a vertical or tilted laser; FIGS. 10B-10F are various cross-sectional views of different embodiments of the trench assuming different shapes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing embodiments of the present invention and is not intended to be limiting in any way, unless otherwise stated.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Figure 1:
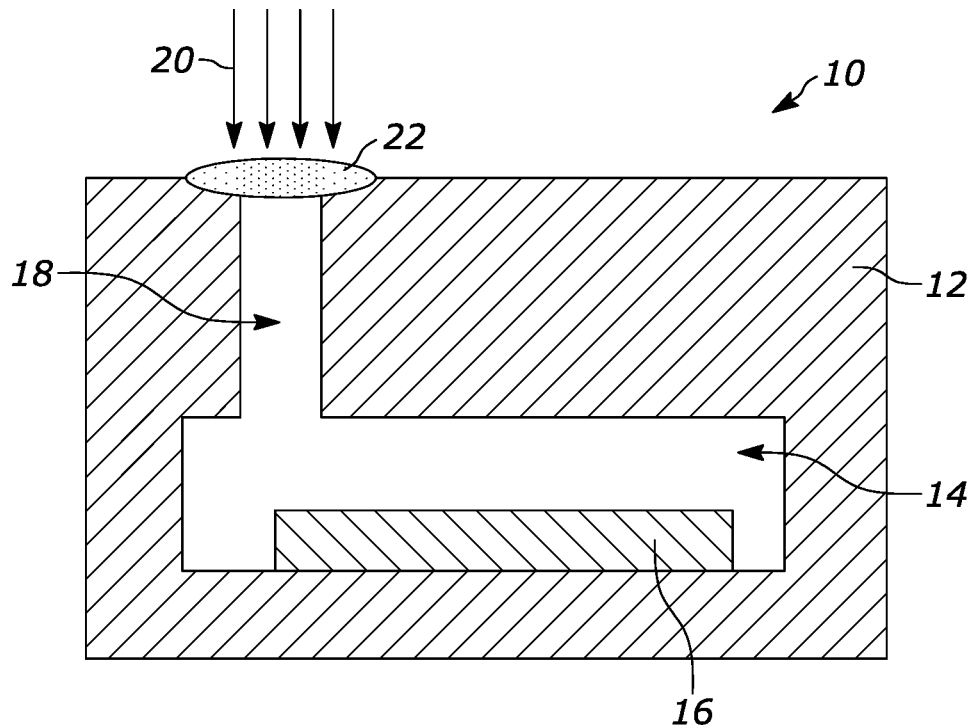
FIG. 1 depicts a cross-sectional view of a pulse laser irradiation technique for sealing a venthole opening of a micromechanical device.

Various micromechanical devices (e.g., mi croelectromechanical systems (MEMS), inertial measurement units (IMUs) etc.) include a venthole opening leading to a chamber that contains an encapsulated device. In recent years, pulse laser irradiation techniques have been utilized for sealing the venthole opening. These technique seal the venthole opening to encapsulate gasses and critical pressure inside the device chamber of the micromechanical device. For example, FIG. 1 illustrates an example of a micromechanical device 10 sealed according to these techniques. The micromechanical device 10 includes a substrate 12, such as a silicon or other material typically used for integrated circuits in micromechanical devices. The term "substrate" can also refer to one or more films or layers of other material (e.g., polycrystalline silicon, silicon dioxide, etc.) layered above an underlying material (e.g., silicon). The substrate 12 is formed with a chamber 14, also referred to as a cavity or pocket. The chamber 14 houses or encapsulates a device 16, which can be any sort of MEMS device or IMU such as an accelerometer, gyroscope, temperature sensor, pressure sensor, or the like. The substrate 12 is also formed with a venthole 18 which allows for initial air or gas communication between the chamber 14 and the environment outside of the micromechanical device 10, until sealed. The venthole 108 and/or chamber 14 may be formed in the layers or materials above a base substrate, and these layers should be included as part of the term "substrate" unless otherwise stated. Sealing the venthole 18 can prevent gasses or outside environmental factors from affecting the gasses or vacuum inside the chamber 14. To seal the venthole 18, laser irradiation is utilized in which a laser beam 20 is directed at the surface above the venthole 18. This causes some of the material of the substrate 12 above the venthole 18 to melt, creating a seal 22 formed by a melt of the substrate 12.

Figure 2:
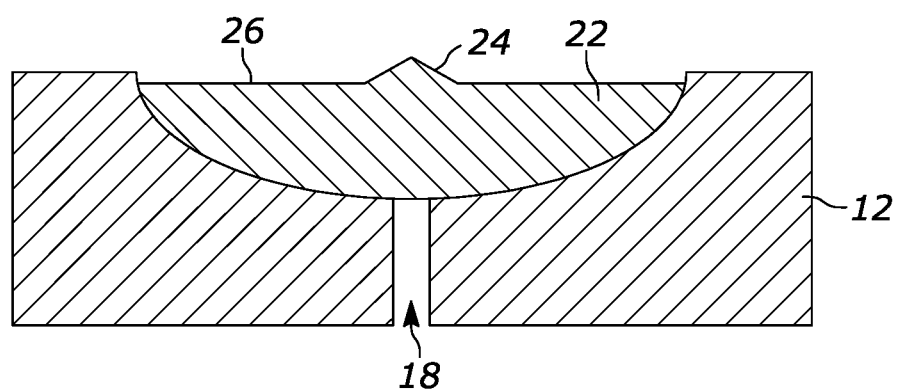
FIG. 2 depicts a cross-sectional view of a sealed venthole after the pulse laser irradiation technique of FIG. 1.

However, this method oftentimes leaves an issue of surface asperity. For example, FIG. 2 shows a portion of the micromechanical device 10 of FIG. 1 after the laser irradiation process is complete. The resulting seal 22 (which is a solidified melt of the material of the substrate 12) includes a surface asperity 24, which is a high spot or bump on an upper surface 26 of the seal 22. This surface asperity 24 can be undesirable in some applications because it can make contact with an opposing surface when the micromechanical device 10 is assembled to another component, for example.

Therefore, this disclosure provides various embodiments for improving the laser irradiation process to eliminate or at least improve the presence of any surface asperities. In some embodiments, a trench is provided in the substrate at a location that is offset from the venthole. This trench creates a zone for where the laser beam is to be aimed during the laser irradiation process. The laser irradiation then melts the material of the substrate in the trench, causing the melt to seal the venthole from beneath the upper surface of the substrate. The result is a seal with no surface asperity that is higher than the upper surface of the substrate. In other embodiments, the laser beam is aimed at the venthole, but at an angle (e.g., obtuse) relative to the axis of the venthole. This can provide substantially beneficial melt characteristics that result in a solidified melt seal with no surface asperity that is higher than the upper surface of the substrate.

Figure 3:
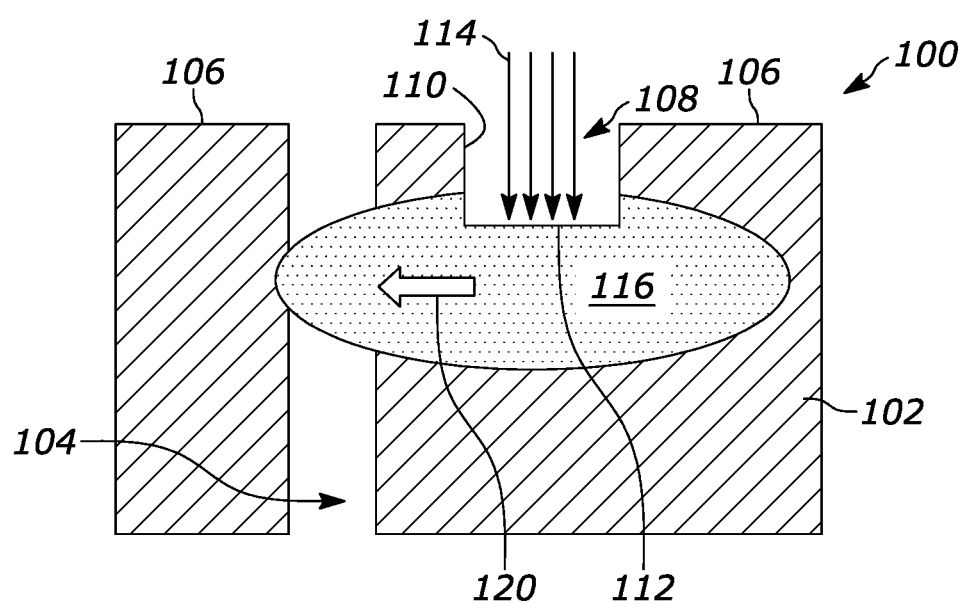
FIG. 3 is a cross-sectional schematic view of a pulse laser irradiation technique in which the laser irradiation if applied to a trench offset from the venthole, according to an embodiment.

These embodiments are exemplified in FIGS. 3-10. Referring to FIG. 3, a micromechanical device 100 includes a substrate 102 with a venthole 104, similar to as described in FIG. 1. The substrate 102 includes an upper surface 106 that defines an upper opening of the venthole 104, as well as a trench 108 offset from the venthole 104. The trench 108 can therefore be referred to as an offset trench. The trench 108 includes one or more side surfaces or sidewalls 110, and a lower surface 112. The lower surface 112 does not extend as long as the venthole 104, such that the trench 108 only partially extends into the substrate 102. Therefore, the trench 108 can be referred to as an indent, depression, or groove formed into the upper surface 106 of the substrate 102.

In order to seal the venthole 104, a laser beam 114 is directed at the trench 108. In some embodiments, the laser beam 114 is directed such that it does not direct light directly at the upper surface 106 of the substrate 102, but rather directs the light only within the confines of the trench 108. In other embodiments, the laser beam 114 is directed such that some of the light is directed on a portion of the upper surface 106 adjacent the trench 108, but not such that it intersects the venthole 104. In other words, the laser beam 114 is directed to a location of the upper surface 106 that is offset from the venthole 104, specifically a location where the trench 108 is located. During the laser irradiation process, the directed laser beam 114 melts the substrate located beneath the loser surface 112 of the trench 108. This creates a melted substrate zone, generally indicated at 116. The melted substrate zone is a portion of the substrate 102 (e.g., silicon) that melts due to reaction from the laser beam 114 during the laser irradiation process.

As shown in FIG. 3, once the substrate melts, it travels laterally to seal the venthole 104 from beneath the upper surface 106 of the substrate. The upper surface 106 at the venthole 104 does not melt; instead, the melt zone 116 of the substrate 102 is located initially offset from the venthole and beneath the upper surface 106. Then, the melt increases in size laterally (e.g., in the general direction of arrow 120, to the left in the view shown in FIG. 3) to seal the venthole 104 from beneath the upper surface 106. This is in contrast to the process shown in FIGS. 1-2 in which the laser beam is directed at the venthole itself so that the melt is located directly at the top surface of the substrate at a location of the venthole, which seals the venthole is at the upper surface of the substrate.

By directing the laser beam 114 to an offset area at the trench 108, the laser beam 114 is not directed at the venthole 104 which avoids the potential of the laser beam 114 from interacting with the devices located within the chamber (not shown) of the substrate. Moreover, since not all of the upper surface surrounding the venthole 104 is melted, there is no surface asperity that would be generated at the venthole 104 (or elsewhere) that would be higher than the upper surface 106 of the substrate 102. If any surface asperities are generated, it would be within the trench 108, or within the venthole 104 but beneath the upper surface 106.

Figure 4A:
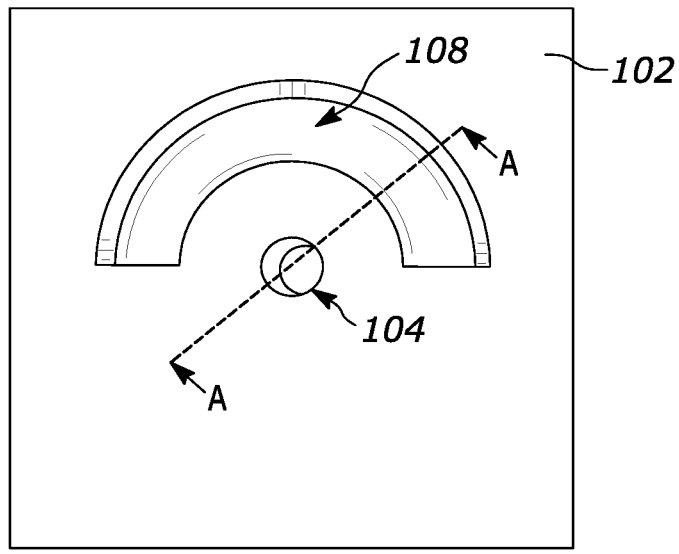
FIG. 4A is a top view of a portion of a micromechanical device in which the offset trench is semi-circular in shape.
Figure 4B:
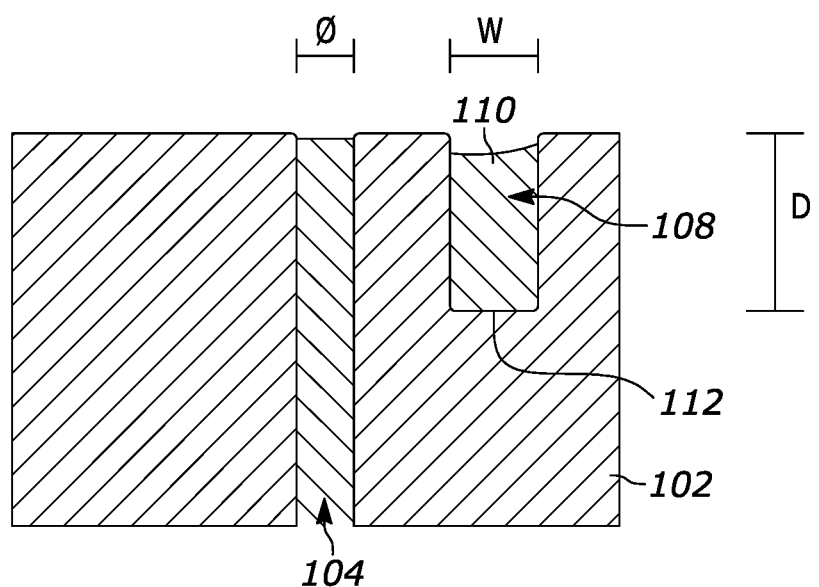
FIG. 4B is a cross-sectional view of the micromechanical device taken along line A-A of FIG. 4A, according to an embodiment.

FIGS. 4A and 4B show an embodiment in which the offset trench 108 is semi-circular in shape, from the perspective of above the substrate 102. The trench 108 extends annularly about the venthole 104. In other embodiments not shown, the trench 108 extends fully about the venthole 104 in a full circular shape. As can be seen in FIG. 4B, the bottom surface 112 of the trench 108 is higher than the bottom opening of the venthole 104.

In the illustrated embodiment, the trench 108 has a width W that is between one and two times (e.g., about 1.5 times) greater than a diameter ø of the venthole 104; a depth D that is between two and four times (e.g., about 3 times) greater than the diameter ø of the venthole 104. The distance between the center of the trench and the central vertical axis of the venthole 104 is about 2.75 times the venthole diameter ø. Of course these measurements are of one embodiment and are not intended to be limited on the claimed invention unless so claimed. The semi-circular shape of the trench 108 has been shown to provide exceeding melt characteristics to properly seal the venthole 104.

Figure 5A:
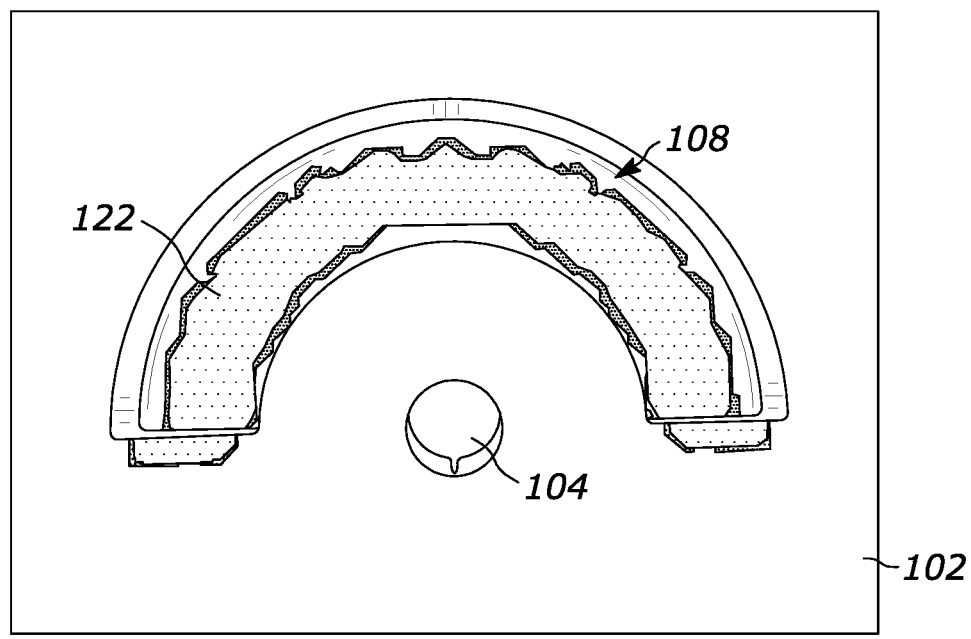
FIG. 5A is a top view of the micromechanical device of FIG. 4A showing the laser irradiation region.

FIG. 5A shows a similar semi-circular shaped trench 108 offset from a venthole 104 as in FIG. 4. Here, also illustrated is a laser irradiation zone 122, representing the region of the substrate 102 on which the laser beam is applied. The laser beam can be applied all at once such that the entire laser irradiation zone 122 is created at a single time. Alternatively, the laser beam can be initially applied to a smaller region than the entire laser irradiation zone 122 but swept over the path or shape of the laser irradiation zone 122. Of course, some of the laser irradiation zone 122 can spill over to a region outside of the trench 108. However, it does not intersect the walls of the substrate 102 that define the venthole 104.

Figure 5B:
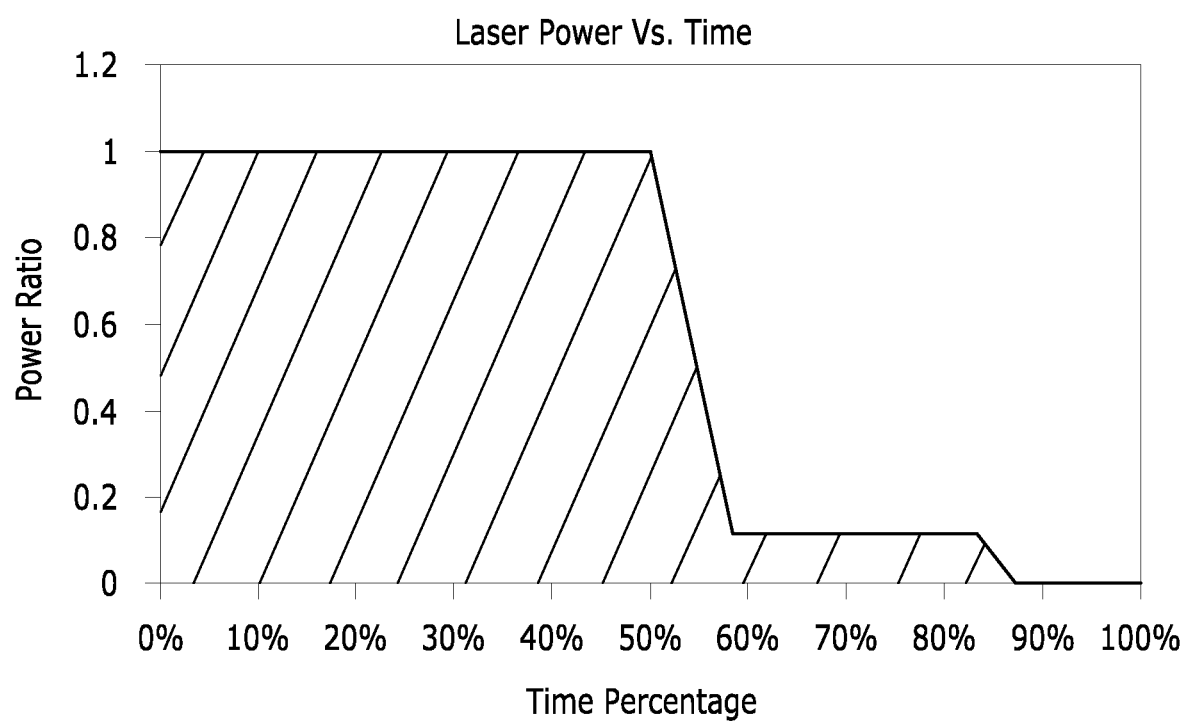
FIG. 5B is a graph of power ratio over time of the laser irradiation, according to an embodiment.
Figure 6:
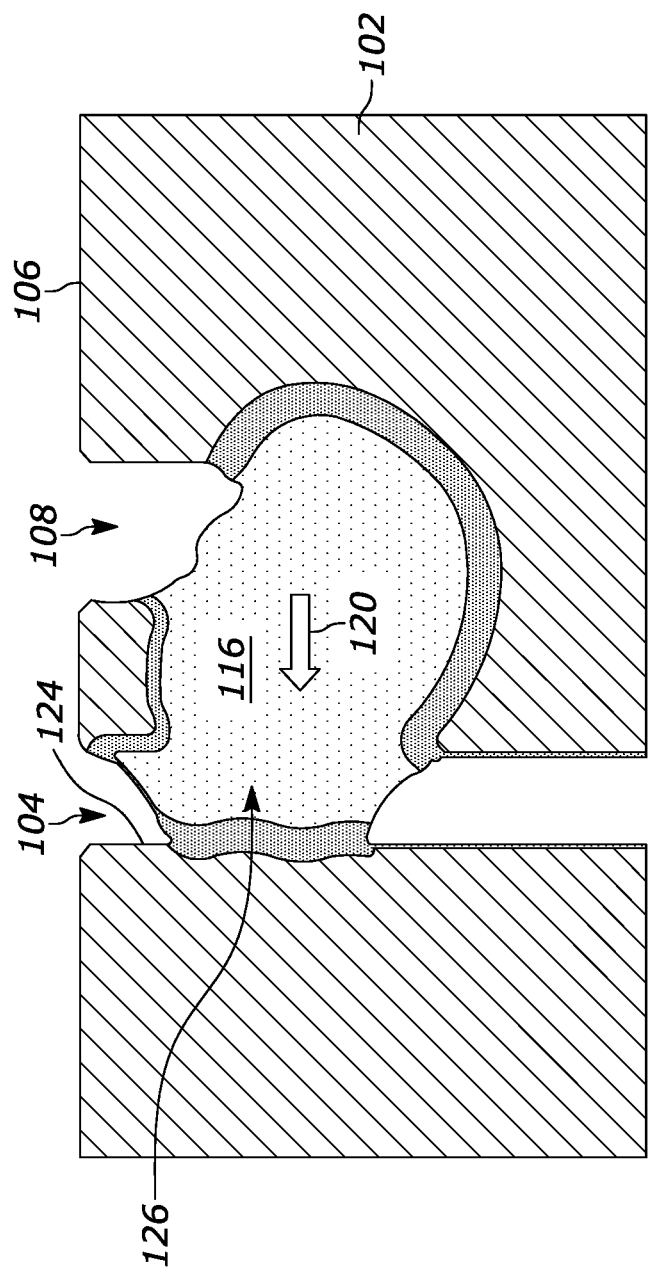
FIG. 6 is a cross-sectional view of a sealed venthole of the micromechanical device of FIG. 5A, sealed via application of laser irradiation to an offset trench, according to an embodiment.

FIG. 5B illustrates a graph of a power ratio to time of the laser pulse applied during the laser irradiation. A power ratio of 1 corresponds to the highest amount of power the laser beam provides. As can be seen, in one embodiment, the laser beam can be applied at a high power (e.g., power ratio of 1) for half of the time that the entire pulse is applied, and then sharply decline about 90% in power for about another 30% of the time that the entire pulse is applied. In embodiments, the laser pulse is applied with a first intensity, and then subsequently a second intensity less than the first intensity, wherein the second intensity is between ten and thirty percent of the first intensity FIG. 6 illustrates the substrate 102 being melted and then solidified to seal the venthole 104. The laser beam, being directed within trench 108, initially melts the material of the substrate 102 under high energy laser irradiation. The melted material starts to move laterally toward the venthole 104, as once again indicated by arrow 120. The melted substrate material then touches an inner wall 124 of the venthole 104 opposite the trench 108, sealing the venthole 104. Once the melted substrate has begun the process of cooling and solidifying, as shown in FIG. 6, the melted material creates a seal 126 that prevents the outside environment from entering the chamber beneath the venthole 104. Notice in FIG. 6 that while surface asperities may appear within the venthole 104 and the trench 108, those asperities are located beneath the upper surface 106 so as to not interfere with the upper surface 106 contacting other products or materials in a flush, face-to-face manner.

Figure 7A:
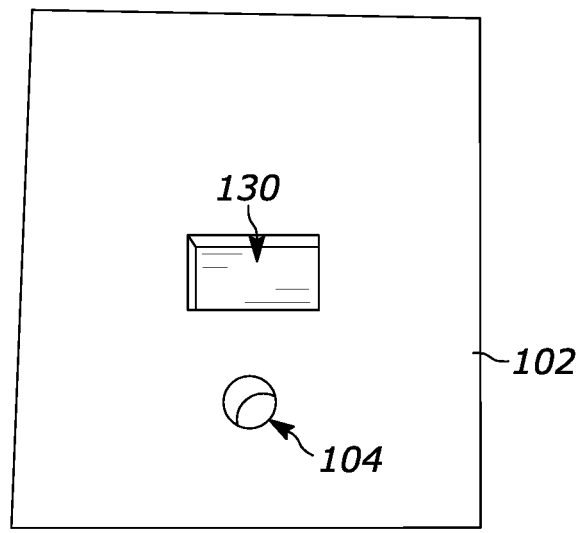
FIG. 7A is a top view of a venthole and offset trench for laser irradiation, according to an embodiment.
Figure 7B:
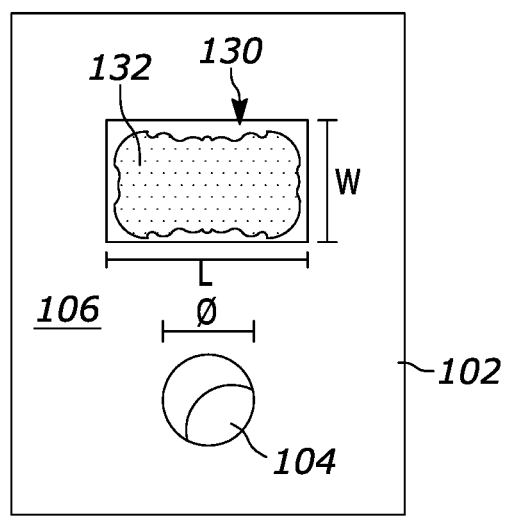
FIG. 7B shows the laser irradiation region within the offset trench.

FIGS. 7A and 7B illustrate an embodiment in which an offset trench 130 is provided in a rectangular shape. Here, once again the trench 130 is formed in the substrate and not extending as deep as the venthole 104. The trench 130 provides a lower surface that is set lower than the upper surface 106 of the substrate 102. The lower surface of the trench 130 provides a laser irradiation zone 132 for the laser beam. In this embodiment, the entire laser beam is focused on an area within the trench 130, although in other embodiments a small portion of the laser beam may melt the upper surface 106 outside of the trench 130.

In this embodiment, the rectangular-shaped trench 130 has a trench width W of about equivalent to a venthole diameter ø, a trench length L of about twice the size of the venthole diameter ø, and a trench depth of about twice the size of the venthole diameter ø. Moreover, in this embodiment, the distance between the center of the trench 130 and the central vertical axis of the venthole 104 is about 2.5 times the venthole diameter ø. Of course these measurements are of one embodiment and are not intended to be limited on the claimed invention unless so claimed.

Figure 8:
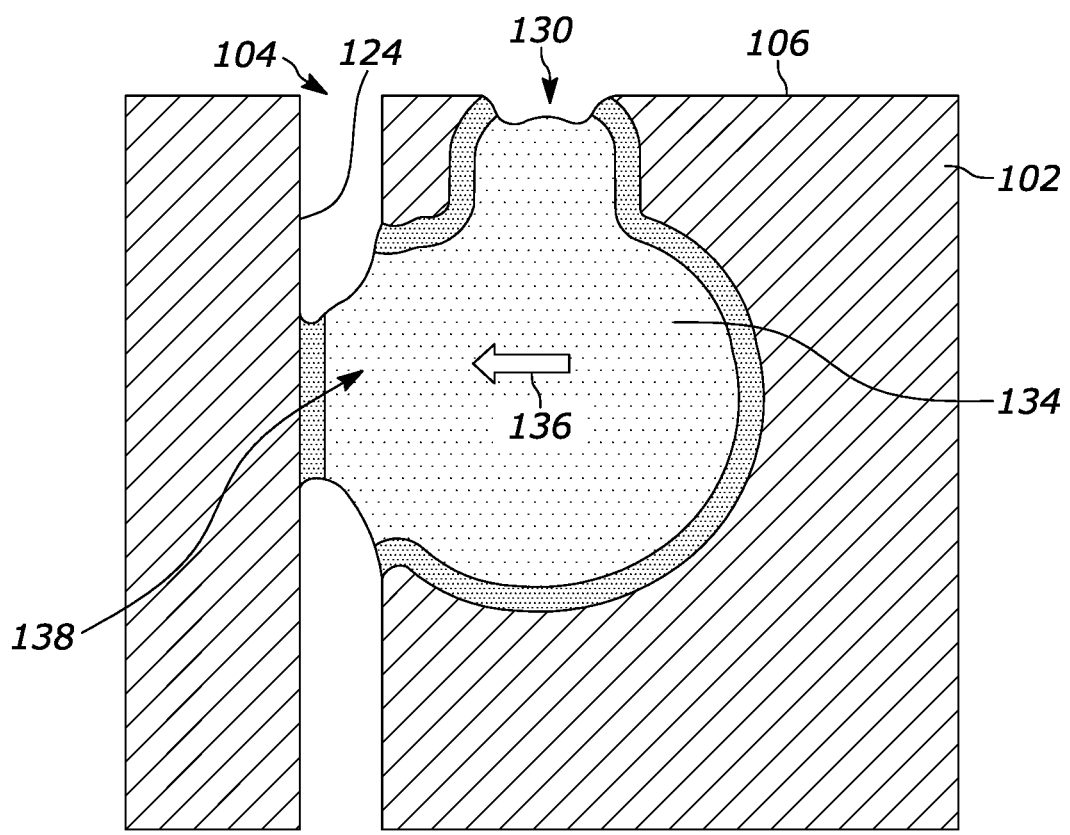
FIG. 8 is a cross-sectional view of a sealed venthole of the micromechanical device of FIGS. 7A-7B, according to an embodiment.

In this embodiment, a single laser pulse with a rectangular energy distribution is used to heat the bottom surface of the trench 130. This creates a seal of the venthole 104 as shown in FIG. 8, which is a cross-sectional view of the substrate of FIG. 7B after the laser pulse has been applied. Here, the substrate 102 is melted within the trench 130, and the melted substrate 134 beneath the upper surface 106 travels laterally in the direction indicated by arrow 136. The melted substrate then contacts an inner wall 124 of the venthole 104 opposite the trench 130, sealing the venthole 104. Once the melted substrate has begun the process of cooling and solidifying, as shown in FIG. 8, the melted material creates a seal 138 that prevents the outside environment from entering the chamber beneath the venthole 104. And, once again in FIG. 8, while surface asperities may appear within the venthole 104 and the trench 130, those asperities are located beneath the upper surface 106 so as to not interfere with the upper surface 106 contacting other products or materials in a flush, face-to-face manner.

Figure 9A:
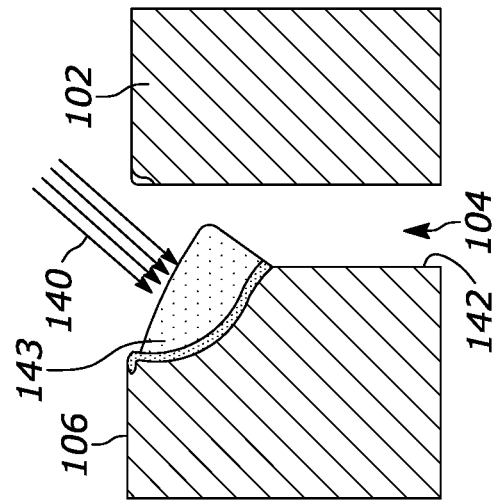
FIGS. 9A-9C show sequential images of a laser irradiation technique of applying the laser at an oblique angle relative to the venthole, according to an embodiment.
Figure 9B:
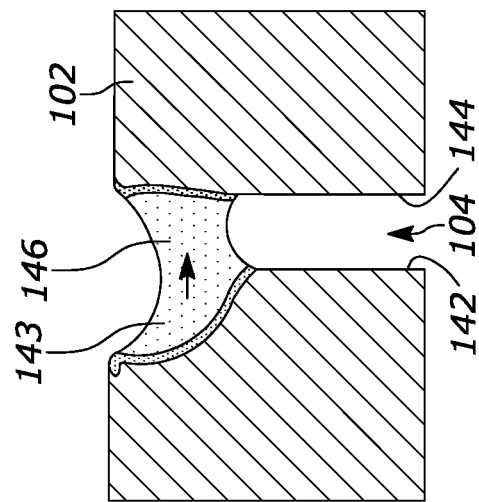
Figure 9C:
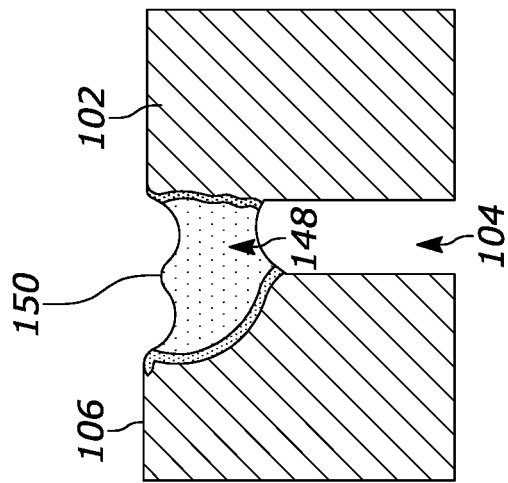

A tilted laser beam may also be used to seal the venthole opening. FIGS. 9A-9C show sequential images of a laser irradiation technique of applying the laser at an angle relative to the venthole. For example, a substrate 102 having a venthole 104 is provided, similar to the above-described embodiments. Prior to the laser irradiation beginning, the laser beam (or associated mechanism that controls the location of the laser beam) is positioned such that the laser beam 140, once activated, is oriented at an oblique angle relative to the upper surface 106 of the substrate, and relative to a vertical axis of the venthole 104. In other words, the upper surface 106 of the substrate 102 extends along a plane, and the laser beam is oriented at an angle θ relative to the plane, wherein θ is between 0 and 90 degrees.

In some embodiments, θ is between 15 and 75 degrees. In some embodiments, θ is between 30 and 60 degrees. In some embodiments, θ is between 40 and 50 degrees. In some embodiments, θ is about 45 degrees.

With this obtusely-angled laser beam 140, at least part of the laser beam is directed at an inner wall 142 of the substrate 102 that defines the venthole 104. This causes a portion of the substrate beneath the upper surface 106 to melt, creating a melted substrate portion 143. FIG. 9B shows a next sequence of the laser irradiation process, in which the laser beam 140 has been deactivated or otherwise turned off. The melted substrate portion 143 begins to travel toward an opposing inner wall 144, opposite the inner wall 142, in the direction indicated by arrow 146. In embodiments, such as when the venthole 104 is circular, the inner walls 142 and 144 can be a single, rounded wall, and reference numbers 142 and 144 merely refer to opposing sides of the inner wall.

FIG. 9C shows a next sequence of the laser irradiation process, again with the laser beam deactivated. The melted substrate portion 143 has begun to solidify to create a solid seal 148 which seals the venthole 104 from the external environment as described above. The seal 148 may solidify with one or more surface asperities 150. However, as in previous embodiments, the surface asperities 150 are located beneath the upper surface 106.

This method can also apply to a scenario in which the venthole 104 is not in the focal plane of the laser. A laser beam can be focused such that it is either a convergent laser beam (e.g., the light rays converge to a plane that intersects the surface on which the laser irradiation is desired) or a divergent beam (e.g., the light rays converge to a plane that is spaced away from the surface on which the laser irradiation is desired, and then diverge before reaching the surface). Referring to FIGS. 9A-9C, a convergent laser beam can be focused such that its light rays converge on a plane that intersects the inner wall 142, for example. In contrast, a divergent beam can be focused such that its light rays converge on a plane spaced between the source of the light rays and the inner wall 142. A convergent laser beam may be preferred in embodiments since a maximum laser energy intensity is applied to the target area (e.g., the inner wall 142), and thus it would be efficiently generating a melt pool at and around the target area. If, on the other hand, the laser beam is divergent, it would also melt the target area (e.g., the inner wall 142) but it may be less efficient than a focused convergent beam.

The tilted laser beam described with reference to FIG. 9 can also be applied to embodiments in which the laser beam is directed to an offset trench. For example, FIG. 10A illustrates an embodiment in which the laser beam 140 can be either angled vertically with respect to the upper surface 106 of the substrate 102, or can be angled (e.g., obtuse) relative to the upper surface 106. In either embodiment, the laser beam 140 can be directed at a trench 160 formed in the substrate 102, wherein the trench is offset (e.g., physically separated from and not intersecting) from the venthole 104.

The trench 160 can take the shape of any of the above-described embodiments. Alternatively, or additionally, the trench 160 can take the shape of the embodiments shown in FIGS. 10B-10F, which are cross-sectional views of the substrate 102 at the trench 160 showing different embodiments of the shape of the trench 160. As shown in FIG. 10B, the trench 160A can have a rounded or oval-shaped depth. As shown in FIG. 10C, the trench 160B can have a crescent-shaped depth. As shown in FIG. 10D, the trench 160C can have a circular-shaped depth. As shown in FIG. 10E, the trench 160D can have a hexagon-shaped depth. As shown in FIG. 10F, the trench 160E can have an L-shaped depth. Each of these embodiments may provide beneficial melting characteristics, and thus sealing characteristics, depending on laser strength, duration, angle, location, focus plane, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of sealing a venthole of a micromechanical device, the method comprising:
   providing a micromechanical device having a substrate, the substrate having an upper surface, and the substrate defining:
   a venthole leading to a chamber, and
   a trench extending downward from the upper surface and located offset from the venthole; and
   applying a laser pulse to the trench to perform laser irradiation on the substrate, wherein the laser irradiation is confined to the trench and does not intersect the venthole, wherein the applying causes a portion of the substrate located below the upper surface to melt and seal the venthole laterally and from beneath the upper surface, and wherein the applying does not melt the upper surface of the substrate at the venthole and seals the venthole without melting the upper surface of the substrate at the venthole.

2. The method of claim 1, wherein the portion of the substrate solidifies with a peak located below the upper surface.

3. The method of claim 1, wherein the trench extends in an arcuate shape around the venthole.

4. The method of claim 3, wherein the trench extends in a semi-circular shape around the venthole.

5. The method of claim 1, wherein the trench has a width that is between one and two times a diameter of the venthole.

6. The method of claim 1, wherein the trench has a depth of between two and four times a diameter of the venthole.

7. The method of claim 1, wherein the laser pulse extends in a direction perpendicular to the upper surface.

8. The method of claim 1, wherein the laser pulse extends in a direction oblique to the upper surface.

9. The method of claim 1, wherein the laser pulse is applied with a constant laser intensity.

10. The method of claim 1, wherein the laser pulse is applied with a first intensity, and then subsequently a second intensity less than the first intensity, wherein the second intensity is between ten and thirty percent of the first intensity.

11. The method of claim 1, further comprising:
    during the step of applying, sweeping the laser pulse along a path, wherein the path is defined by a shape of the trench.

* * * * *